(12) United States Patent
Yoshida

(10) Patent No.: US 7,063,193 B2
(45) Date of Patent: Jun. 20, 2006

(54) SEAL STRUCTURE FOR RELATIVELY ROTATIONAL MEMBERS

(75) Inventor: Shouji Yoshida, Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 55 days.

(21) Appl. No.: 10/254,400

(22) Filed: Sep. 25, 2002

(65) Prior Publication Data

US 2004/0056428 A1    Mar. 25, 2004

(51) Int. Cl.
*F16D 27/115*    (2006.01)
*F16J 15/32*    (2006.01)

(52) U.S. Cl. .................. 192/35; 192/84.7; 192/84.91; 277/572

(58) Field of Classification Search .............. 192/35, 192/40, 84.7, 84.91, 54.52; 277/572, 549
See application file for complete search history.

(56) References Cited

U.S. PATENT DOCUMENTS

| 4,792,243 | A | * | 12/1988 | Takeuchi et al. | 384/486 |
| 4,874,261 | A | * | 10/1989 | Colanzi et al. | 277/574 |
| 5,149,207 | A | * | 9/1992 | Vignoito | 384/478 |
| 6,065,879 | A | * | 5/2000 | Mitsue et al. | 384/448 |
| 6,109,408 | A | * | 8/2000 | Ikeda et al. | 192/35 |
| 2002/0079179 | A1 | * | 6/2002 | Hirota et al. | 192/35 |
| 2002/0170795 | A1 | * | 11/2002 | Yasui et al. | 192/35 |

FOREIGN PATENT DOCUMENTS

JP    10-292827    1/1998

* cited by examiner

*Primary Examiner*—Rodney H. Bonck
(74) *Attorney, Agent, or Firm*—Morrison & Foerster LLP

(57) ABSTRACT

A seal structure is disclosed as mounted in a coupling 1, exposed in the vicinity of a stationary member 14, with a dust cover 15 being mounted to a cylindrical member 19 for preventing foreign material from entering a gap between the coupling 1 and the stationary member 14, and a seal member 17 is disposed at a position opposed to the dust cover on the stationary member 14, with a seal portion 123 of the seal 17 being held in sliding contact with the dust cover 15.

19 Claims, 9 Drawing Sheets

SEAL STRUCTURE FOR RELATIVELY ROTATIONAL MEMBERS

BACKGROUND OF THE INVENTION

The present invention relates to a seal structure for relatively rotational members to be employed between a rotary member, such as a coupling exposed to and connected to a propeller shaft of a four-wheel drive vehicle, and a stationary member that retains the rotary member to a vehicle body.

In general, attempts have heretofore been made to propose structures as disclosed in Japanese Patent Application Laid-open No. 1-182633 and 10-292827 wherein a coupling (rotary member) is exposed to and connected to a propeller shaft of a four-wheel drive vehicle and wherein a rotary member is exposed outside and located in the vicinity of a stationary member. With the structure wherein the rotary member is exposed outside and located, as shown in Japanese Patent Application Laid-open No. 10-292827, an attempt has been made to dispose a seal structure, such as a dust cover or seal members, between the rotary member and the stationary member to prevent foreign material from entering a relatively rotational region between the stationary member and the rotary member.

SUMMARY OF THE INVENTION

However, with the coupling (rotary member) disposed on the propeller shaft of the four-wheel drive vehicle in a way as proposed in the related art structure, there are requirements for a housing, that is the rotary member, to be made of aluminum alloy (light metal) because of needs for the rotary member to be light weighted to lower a momentum of inertia.

But, in a case where the housing, that forms the rotary member, is made of aluminum alloy (light metal), the aluminum alloy has a low hardness to cause a sliding portion between the seal member and the housing to be easily worn, resulting in an issue of an inability of easily determining the sliding portion.

Further, while another proposal has been made in the past to provide the dust cover to improve an effectiveness for preventing entry of foreign material, it has been a usual practice to have the dust cover and the seal member to be located at separate positions to need separate mounting spaces, causing a difficulty in structuring an entire structure of the coupling in a compact configuration.

It is, therefore, an object of the present invention to provide a seal structure which is disposed between a rotary member, which is located to be exposed outside, and a stationary member, and which has an increased sealing performance. It is another object of the present invention to provide a seal structure which enables the rotary member to be made of light material without increasing the number of component parts. It is another object of the present invention to provide a seal structure which is capable of miniaturizing a device involving the seal structure. It is a further object of the present invention to provide a seal structure which is capable of decreasing costs of a device involving the seal structure. It is a further object of the present invention to provide a seal structure which, when installed in a vehicle, enables fuel consumption to be improved.

According to a first aspect of the present invention, there is provided a seal structure for sealing a gap between a first member and a second member disposed to be rotational relative to the first member, the seal structure comprising: a cover member preventing foreign material from entering the gap; and a seal member fixedly secured to at least one of the first and second members and held in sliding contact with the cover member to seal the gap.

With the seal structure according to the first aspect of the present invention, arranging the seal member to be held in sliding contact with the dust cover (cover) mounted to a rotary component (second member) of the rotary member prevents the rotary component from directly sliding with the seal member.

Accordingly, even in case of the rotary component being made of light metal such as aluminum alloy, no provability occurs for the rotary component to be worn due to sliding with the seal member and, therefore, the rotary member can be made of light metal to cause the rotary member to be light weighted to lower a momentum of inertia for thereby enabling a fuel consumption (drive power consumption) of an engine (prime mover) to be improved.

Further, using the dust cover as a member with which the seal member slides enables the seal structure to be obtained, which is more simplified in structure than the related art seal structure (with no need for a specific consideration in design to form the sliding portion on the rotational member) while enabling reduction in the number of component parts.

Furthermore, since the seal member is disposed between the dust cover and the stationary member (at the same area in which both the dust cover and the seal member are located), the seal structure is suffice to have a narrower mounting space than that of the structure in which the seal member and the dust cover are separately located, resulting in a compact structure and light weight of the entire structure of the rotary member involving the dust cover.

With the seal structure set forth above, moreover, the freedom of selecting material of the rotary member is increased and, therefore, it is possible for the rotary member, which is made free from sliding the seal member, to be made of, in addition to light metal such as aluminum alloy, other material such as plastic resin provided that a desired strength is obtained.

From the foregoing description, it will be appreciated that remarkable reduction is achieved in costs such as part costs, management costs for component parts and assembling costs.

A second aspect of the present invention concerns a seal structure for sealing a gap between a first member and a second member disposed to be rotational relative to the first member, the seal structure comprising: a seal member disposed between the first member and the case-like torque transmitting member; wherein the second member includes a case-like torque transmitting member; wherein the case-like torque transmitting member is supported with the first member via a bearing at a position in the vicinity of the seal member within an area axially inward of the first member along a rotational axis of the case-like torque transmitting member; and wherein the seal member has a sliding radius of curvature smaller than a rotating radius of curvature of the bearing.

With such a structure, selection of bearings is made possible with a priority given to a supporting function for the case-like torque transmitting member. That is, there is no need for employing specified bearings involving a sealing function and, consequently, a designer becomes free from restriction in design and layout space, resulting in a remarkable reduction in costs.

Thus, it becomes reasonable for the seal member to be selected from general-purpose seal members for preference.

Further, selecting the sliding radius of curvature of the seal member to be in a small value enables a peripheral speed to be decreased with a resultant further improvement in the sealing capability.

DETAILED DESCRIPTION OF THE PREFERRED EMBODIMENTS

A seal structure of an embodiment according to the present invention is described below with reference to FIGS. 1 and 9.

Figure 1:
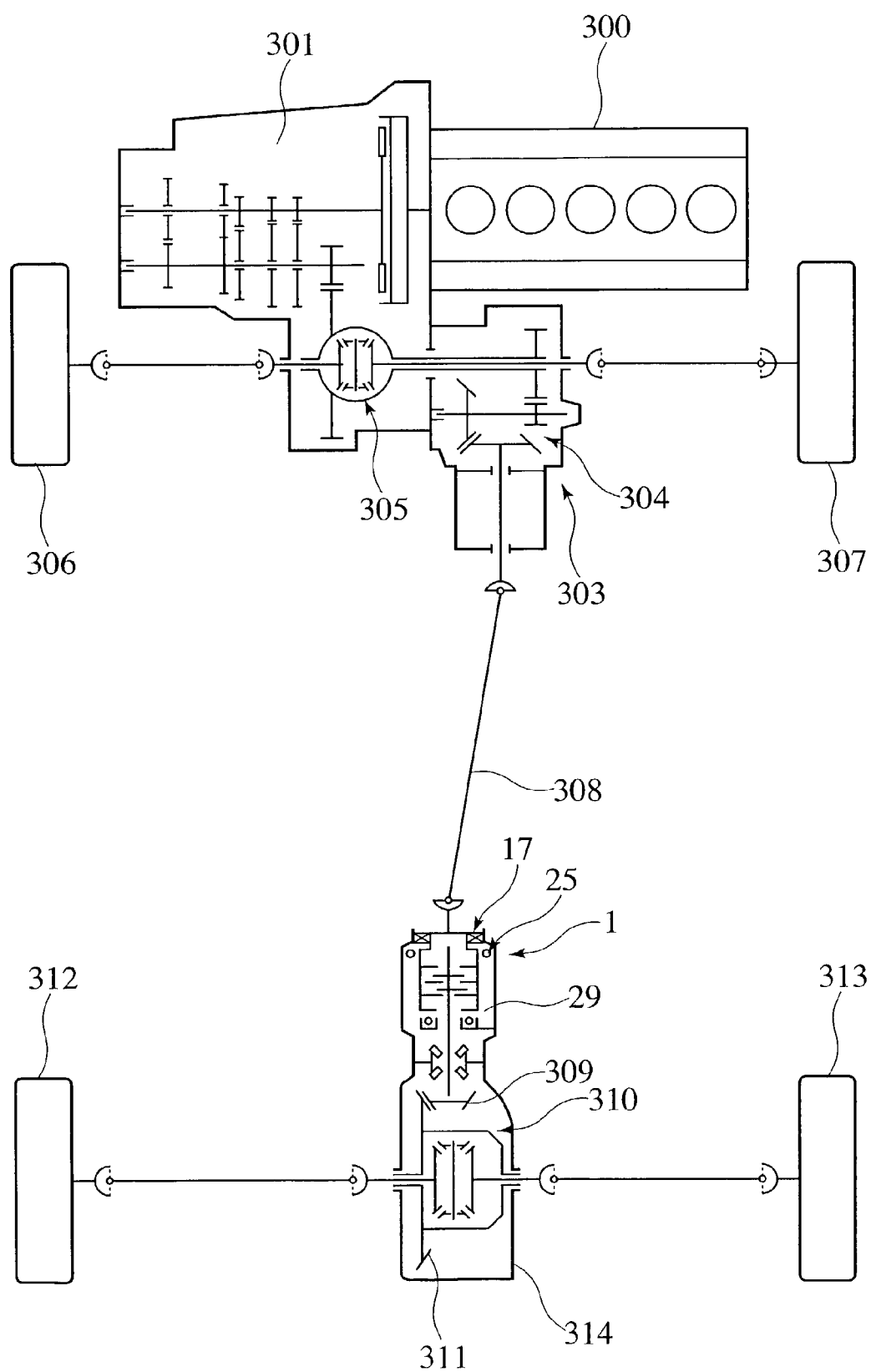
FIG. 1 is a skeleton structural view illustrating a power transmission system of a vehicle installed with an electromagnetic coupling employing a seal structure of a first embodiment according to the present invention.

FIG. 1 is a skeleton structural view illustrating a vehicle power transmission system incorporating an electromagnetic coupling that employs the seal structure of the embodiment according to the present invention. The vehicle power transmission system shown in FIG. 1 is shown as including a transversely installed engine (prime mover) 300, a power transmission 301, a transfer unit 303, a directional change-over gear mechanism 304 disposed inside the transfer unit 303, a front differential gear (differential unit for distributing a drive power output of the engine to right and left wheels) 305, right and left front wheels 306,307, a propeller shaft 308, an electromagnetic coupling 1, a drive pinion gear 309, a rear differential gear 310, a ring gear 311, right and left rear wheels 312,313 and a differential carrier 314.

The drive power output of the engine 301 is transmitted to a differential case of the front differential unit 305 from an output gear of the power transmission 301, from which the drive power output is distributed over the right and left front wheels 306,307 via front wheel axles.

Further, as the directional change-over gear mechanism 304 is coupled, rotation of the differential case is transmitted via the transfer unit 303 to the propeller shaft 308 through which the drive power output is further transferred to the electromagnetic coupling 1.

As the electromagnetic coupling 1 is coupled, the drive power output of the engine 301 is transmitted through the propeller shaft 308 and a drive pinion 309 to the rear differential unit 310, from which the drive power output is further distributed via the rear differential unit 310 to the right and left rear wheels 312,313 to render a vehicle to be operative in a four-wheel drive mode.

Furthermore, if the electromagnetic coupling 1 is uncoupled, the component parts subsequent to the propeller shaft 308 are disconnected to render the vehicle to be operative in a two-wheel drive mode.

Thus, the electromagnetic coupling 1 serves as a clutch structure that is located in a rear power transmission line, closer to the rear wheels 312,313, to be disconnected during a two-wheel drive mode in a four-wheel drive vehicle and executes control of coupling or uncoupling the power transmission line associated with the rear wheels 312,313 while performing control of the drive power output to be transferred to the rear wheels 312,313. Although the propeller shaft 308 is shown in a simplified form in FIG. 1, in actual practice, the propeller shaft, that forms a part of the rear power transmission line, is connected through a joint portion to the electromagnetic coupling 1 which in turn is connected to a ring gear 313 of the rear differential gear 310 via a drive pinion gear 309 in meshing engagement. In this respect, it is to be noted that a left side of a structure shown in FIG. 2 corresponds to a front side (engine side) of such a vehicle.

The electromagnetic coupling 1 has a bearing 25 and the seal structure of the present invention provided in a front direction of the vehicle.

Figure 2:
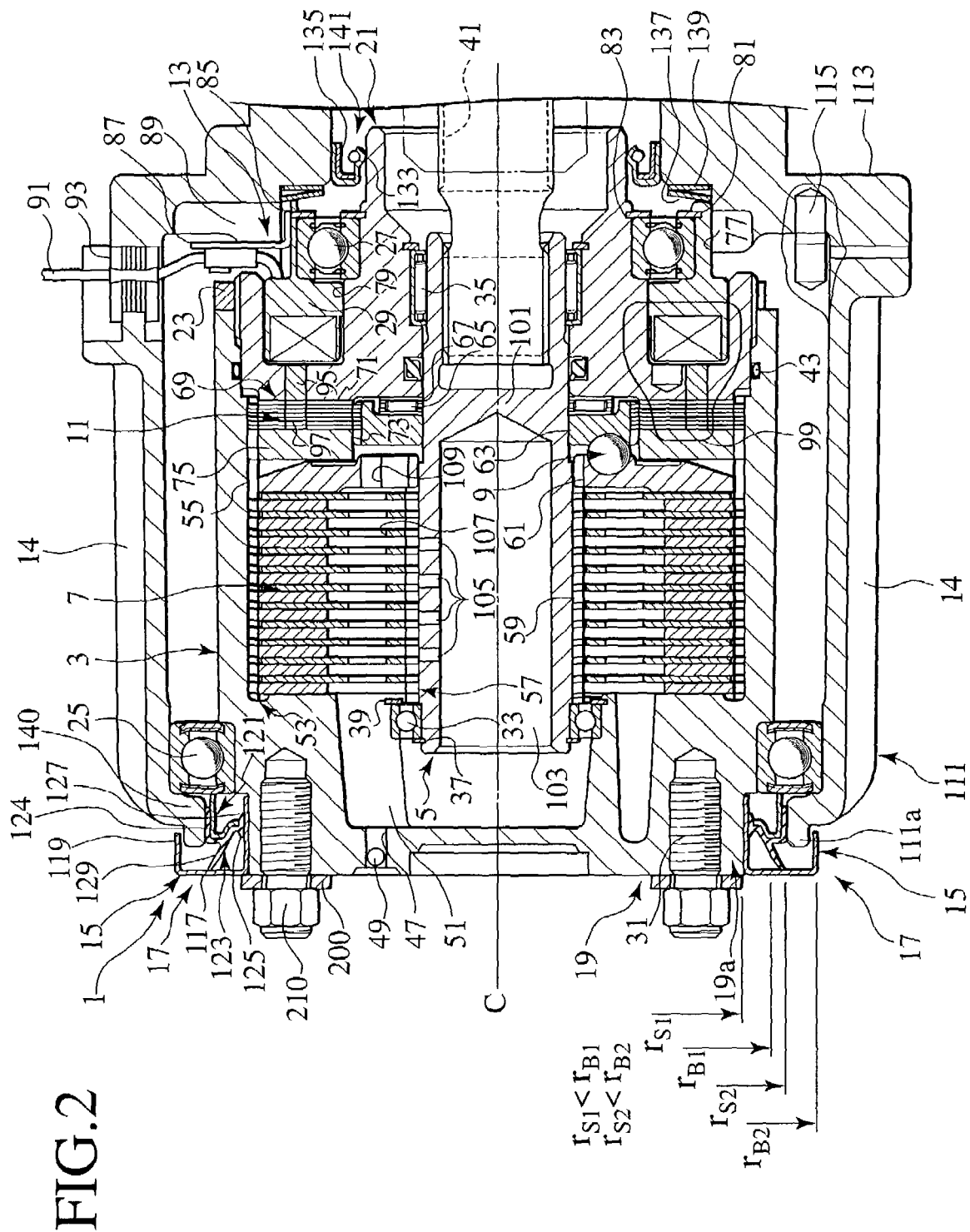
FIG. 2 is a cross sectional view illustrating the electromagnetic coupling employing at the seal structure of the first embodiment according to the present invention.

FIG. 2 is a cross sectional representation of the electromagnetic coupling incorporating the seal structure of the embodiment according to the present invention.

The electromagnetic coupling 1 is shown as including a rotary case 3 (case-like torque transmitting member), an inner shaft 5 (shaft-like torque transmitting member), a multi-plate type main clutch 7, a ball cam 9, a pilot clutch 11, an electromagnet 13, a housing 14 (stationary member), a dust cover 15, a seal (seal member) 17, and a controller.

The housing 14 is supported on a vehicle body by means of a support fixture, fixedly attached to a floor panel of the vehicle and a flexible support member.

The rotary case 3 is comprised of a cylindrical member 19 (case-like torque transmitting member) formed with a bottom wall and made of aluminum alloy (non-magnetic material), and a rotor 21, made of iron alloy (magnetic material), such as low carbon steel material, which is located at a rear side.

The rotor 21 is screwed into a rearward opening portion of the cylindrical member 19 and is fixedly secured thereto by means of a locked nut function of a nut 23.

A front end of the cylindrical member 19 is supported with the housing 14 via the ball bearing 25 of a type sealed on both sides, and the rotor 21 is supported with the housing 14 via a ball bearing 27 of a type sealed on both sides and a core 29 of the electromagnet 13.

A companion flange is fixed to the front end of the cylindrical member 19 by means of a stud bolt 31, with the companion flange being integrally formed with a joint fork of a coupling.

The cylindrical member 19 is connected via this coupling to the transfer side propeller shaft to allow the drive power output of the engine to be transmitted through these power transmitting components to the cylindrical member 19 of the rotary case 3.

The inner shaft 5 is inserted through the cylindrical member 19 of the rotary case 3 from the rear side thereof, with a fore end of the inner shaft 5 being rotationally supported with the cylindrical member 19 via a bearing 33 while an aft end of the inner shaft 5 is supported with the rotor 21 via a needle bearing 35. Further, the inner shaft 5 is axially positioned with respect to the rotary case 3 by means of snap rings 37, 39 and the ball bearing 33.

Coupled to the inner shaft 5 via a splined connection is a connecting shaft 41l (fore end of the drive pinion gear 309).

The connecting shaft 41 is connected via a drive pinion gear 309 to a ring gear 311, in meshing engagement therewith, of a rear differential unit 310 to rotationally drive the same.

An O-ring 43 is disposed between the cylindrical member 19 of the rotary case 3 and the rotor 21. Also, an X-ring 45, that is a seal with an X-shape in cross section, is disposed inwardly of the needle bearing 35 between the rotor 21 and the inner shaft 5. Thus, the electromagnetic coupling 1 (rotary case 3) is tightly sealed with the O-ring 43 and the X-ring 45.

The tightly sealed rotary case 3 is filled with oil through an oil bore 47 formed in the cylindrical member 19, with the oil bore 47 being sealed with a check ball 49 tightly fitted thereto after the oil has been charged. Further, the cylindrical member 19 is internally formed with a space 51, that serves as an oil flow passage, at a position associated with the oil bore 47.

The main clutch 7 is disposed between the rotary case 3 and the inner shaft 5, with outer plates 53 of the main clutch 7 being coupled to a splined portion 55 internally formed in the rotary case 3 (cylindrical member 19) while inner plates 57 of the main clutch 7 are coupled to a splined portion 59 formed on an outer periphery of the inner shaft 5.

The ball cam 9 is disposed between a pressure plate 61 and a cam ring 63.

The pressure plate 61 has an inner periphery coupled to the splined portion 59 of the inner shaft 5 to urge the main clutch 7 toward the rotary case 3 by the action of a cam thrust force exerted by the ball cam 9 to be brought into a coupled condition.

The cam ring 63 is disposed on an outer periphery of the inner shaft 5 for relatively rotational movement, and disposed between the cam ring 63 and the rotor 21 are a thrust bearing 65 and a washer 67 which bear a cam reaction force exerted by the ball cam 9.

The pilot clutch 11 is disposed between the cylindrical member 19 of the rotary case 3 and the cam ring 63, with outer plates 69 of the pilot clutch 11 being coupled to the splined portion 55 of the cylindrical member 19 while inner plates 71 of the pilot clutch 11 are coupled to a splined portion 73 formed on an outer periphery of the cam ring 63.

Disposed between the pilot clutch 11 and the pressure plate 61 is an armature 75, whose outer periphery is coupled to the splined portion 5 of the rotary case 3 for freely axial movements.

A core 29 of the electromagnet 13 is press fitted to a cylindrical bore 77 formed in the housing 14, which supports the rotor 21 via the ball bearing 27 as set forth above. Further, the core 29 is inserted into a concave portion 79, formed in the rotor 27, with an appropriate air gap and is axially positioned with respect to the rotor 21 by means of snap rings 81, 83 and the ball bearing 27.

Further, a retaining member 87 engages a recess 85 formed in the core 29 and also engages an engagement portion 89 formed in the cylindrical bore 77 of the housing 14 to hold the electromagnet 13 (core 29) for a non-rotary capability.

A lead wire 91 of the electromagnet 13 is clipped with the retaining member 87 and extends through a grommet 93 outside the housing 14 to be connected to a battery installed on the vehicle.

The rotor 21, the pilot clutch 11 and the armature 75 form a magnetic flux path of the electromagnet 13.

The rotor 21 is divided into radially outer and inner halves with a ring 95 made of austenite stainless steel. Also, each of the plates 69, 71 of the pilot clutch 11 is formed with circumferentially spaced cutouts 97 at a radial position corresponding to the ring 95 and associated bridge portions interconnecting these cutouts 97 with one another. The ring 95 and the cutouts 97 avoid the magnetic flux from being shorted on the magnetic flux path.

The controller performs excitation of the electromagnet 13, control of an excitation current and interruption of excitation.

As the electromagnet 13 is excited, a magnetic flux loop 99 is established in the magnetic flux path to attract the armature 75, causing the pilot clutch 11 to be urged into the coupled condition to produce a pilot torque.

When the pilot torque is produced, the ball cam 9 is exerted with a thrust force from the rotary case 3 via the pilot clutch 11 and the cam ring 63 at a level depending on the magnitude of the pilot torque, thereby causing the main clutch 7 to be urged and coupled via the pressure plate 61 to allow the electromagnetic coupling 1 to be brought into a coupled condition.

Also, as set forth above, since the cylindrical member 19 of the rotary case 3 is made of aluminum alloy of the non-magnetic material to preclude the magnetic flux from being leaking from the magnetic flux path 99 to the cylindrical member 19 to allow the magnetic flux to be efficiently directed to the armature 75, the pilot clutch 11 is enabled to obtain a given pilot torque such that the electromagnetic coupling 1 obtains a given magnitude of coupling torque.

As the electromagnetic coupling 1 is coupled, the drive power output of the engine is transmitted from the inner shaft 5 to the rear differential unit via the rear-differential side propeller shaft whereupon the drive power output is distributed with the rear differential unit to the right and left rear wheels to allow the vehicle to be brought into the four-wheel drive condition, resulting in an improved rough road covering property and stability of the vehicle body.

During such operation, if the excitation current of the electromagnet 13 is regulated with the controller to control the density of the magnetic flux, the slip rate of the pilot clutch 11 is varied to change the pilot torque and, therefore, it is possible for the coupling force (the magnitude of the drive power output to be transmitted to the rear wheels via the electromagnetic coupling 1) of the main clutch 7 to be adjusted.

With such an adjustment of the coupling force, the distribution ratio of the drive power output between the front and rear wheels can be arbitrarily controlled such that, when implementing such a control during a turning travel, an improved driveability and stability of the vehicle can be obtained.

Further, when interrupting the excitation of the electromagnet 13, the pilot clutch 11 is uncoupled to cause the thrust force of the ball cam 9 to be lost, with a resultant uncoupling of the main clutch 7 to cause the electromagnetic coupling 1 to be brought into the uncoupled condition.

If the electromagnetic coupling 1 is uncoupled, the rear-differential side propeller shaft and the rear wheels are disconnected from the front propeller shaft to allow the vehicle to be brought into the two-wheel drive condition for driving only the front wheels, resulting in an improved fuel consumption of the vehicle.

The hollow inner shaft 5 is separated with a wall portion 101 to form a volume increasing space portion 103 for increasing a volume of oil to be charged. The volume increasing space portion 103 contains charged oil and air like in other areas inside the rotary case 3.

The volume increasing space portion 103 is in communication with the main clutch 7 via the space 51 between the inner shaft 5 and the cylindrical member 19 and the ball bearing 33, or via four pieces of radial flow passages 105 formed in the inner shaft 5.

When the electromagnetic coupling 1 (inner shaft 5) is rotated, the oil in the volume increasing space portion 103 is caused to flow through the space 51, the ball bearing 33 and the radial flow passages 105 to lubricate and cools the bearing 33, the main clutch 7, the ball cam 9, the pilot clutch 11, the bearing 65 and the washer 67.

Further, since the inner plates 57 of the main clutch 7 are formed with oil apertures 107, respectively, which promote the movement of oil toward the ball cam 9, the pilot clutch 11 and the bearing 65 which are consequently lubricated and cooled at an increased efficiently.

Furthermore, the pressure plate 61 is formed with a through bore 109. The through bore 109 eliminates a moving resistance of the pressure plate 61 due to the oil to improve an operation response of the main clutch 7 while serving as a flow passage of oil to promote the flow of oil into the ball cam 9 and the pilot clutch 11 which are consequently lubricated and cooled at an improved efficiency.

The housing 14 is comprised of a front housing 111 and a rear housing 113 which are made of iron alloy, respectively, with the front and rear housings 111, 113 being positioned with respect to one another by means of a stud pin 115 and fixedly secured to one another by means of bolts. Also, the housing 14 may be formed of material made of aluminum alloy.

The electromagnetic coupling 1 is protected with the housing 14 from being impinged upon foreign material such as stones flying during the travel or stepped portions and convex portions appearing during the travel.

The dust cover 15 is made of iron alloy and press fitted to a fore end 19a of the cylindrical member 19.

Further, the seal member 17 is disposed between the dust cover 15 and a fore end 111a (on the stationary member at a position opposed to the dust cover) of the front housing 111.

Furthermore, formed between the dust cover 15 and the front housing 111, 111a is an appropriate gap.

Moreover, disposed between the rear housing 113 and the rotor 21 is a seal member 141.

The seal member 17 and the seal member 141 serve to prevent foreign material such as dusts and moisture from entering the gap between the housing 14 and the rotary case 3.

Accordingly, there is no probability for water and dusts from entering an air gap between the core 29 of the electromagnet 13 and the rotor 21 to prevent the rotor 21 (rotary case 3) from being locked due to biting of dusts, freezing of water and generation of rusts to maintain a function of the electromagnetic coupling 1 in its normal condition.

Further, such a protective ability to prevent entry of water and dusts enables non-seal type ball bearings to be employed instead of the both-side seal type bearings 25, 27, enabling manufacturing costs to be reduced to that extent.

Figure 3:
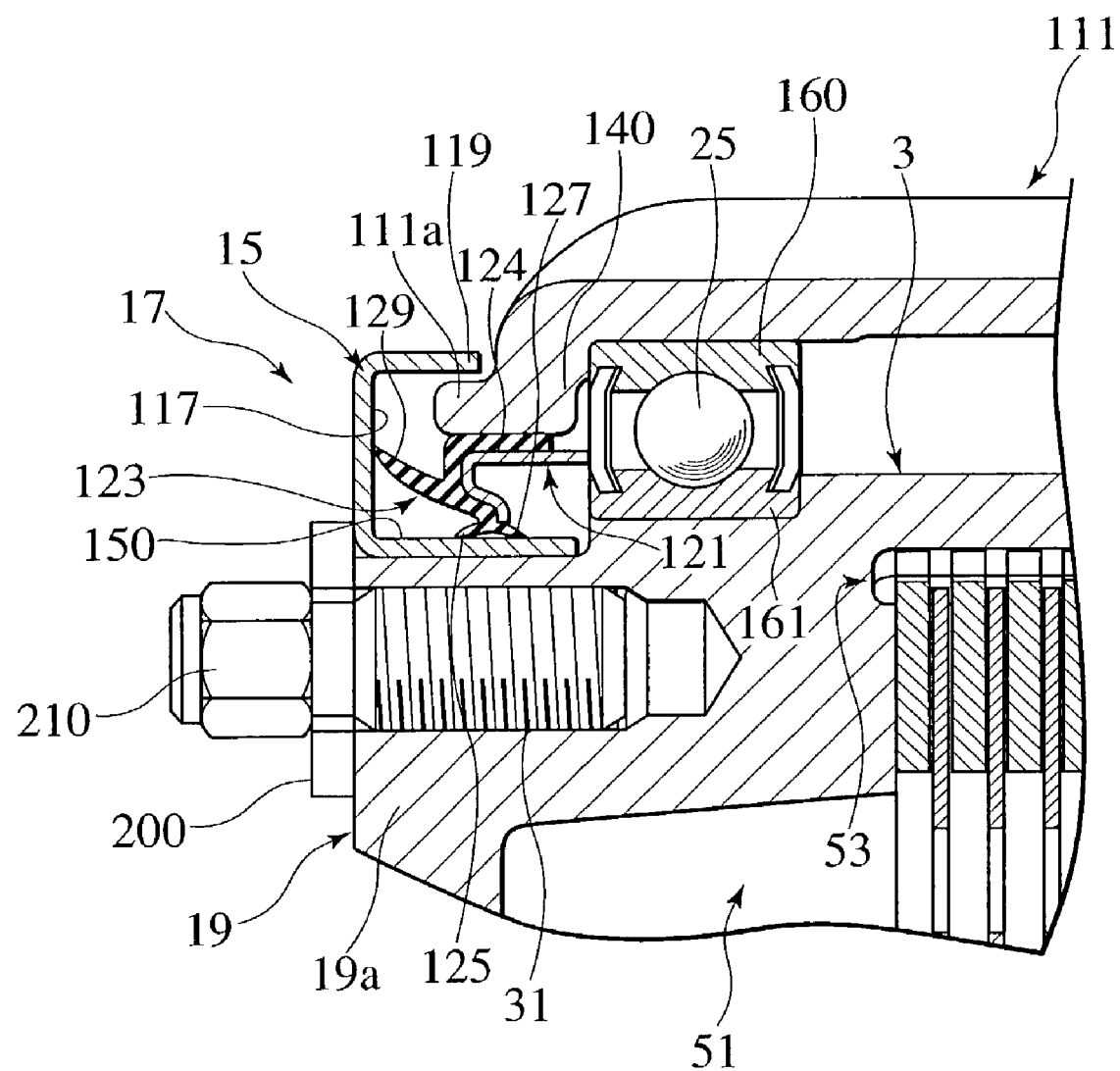
FIG. 3 is a cross sectional view illustrating an essential part of the seal structure of the first embodiment shown in FIG. 1.

FIG. 3 is an enlarged cross sectional view illustrating an essential part of the seal structure of the embodiment according to the present invention for use in the electromagnetic coupling shown in FIG. 2.

The seal member 17 is comprised of a retaining fixture (retaining member) 121 and a seal member 123 that is integrally formed with a plurality of (three pieces in the first embodiment) lips 125, 127, 129.

The retaining fixture 121 is press fitted to the fore end 111a of the front housing 111 by means of a base portion 124 of the seal member 123. Such a press fitted portion may be additionally applied with sealing material. Also, the lips 127, 129 are held in sliding contact with the dust cover 15. In particular, the lip 127 is held in sliding contact with a thrust surface 150 extending from a dust cover 15 concentric with a rotational axis of the cylindrical member 19, and an annular sliding portion is formed between the thrust surface 150 and the seal portion 123. Also, the lip 129 is held in sliding contact with a radial surface (side wall) 117 of the dust cover 15 concentric with the rotational axis of the cylindrical member 19, and an annular sliding portion is formed between the radial surface 117 and the seal portion 123.

Thus, the presence of sliding contact between the lip portion 129 and the radial surface 117 of the dust cover 15 concentric with the rotational axis of the cylindrical member 19 provides an expelling action by which foreign material is discharged radially outward of the rotary shaft of the cylindrical member 19 to enable foreign material to be effectively prevented from entering the sliding portions of the seal member 17.

Further, since the seal member 123 (at the lips 127, 129) are held in sliding contact with the dust cover 15, which is made of iron alloy to have a high hardness, and there is no probability for the seal member 123 to slide on the cylindrical member 19, which is made of aluminum alloy with low hardness, the cylindrical member 19 is avoided from being abnormally worn due to the sliding contact with the lips 127, 129.

Furthermore, since the dust cover 15 is made of material (such as general structural pressing steel material) with a hardness (normally higher than 350 HV) that is higher than that of material (such as aluminum alloy) selected to form the cylindrical member 19, it is possible for the dust cover 15, while remained in sliding contact with the seal portion 123, to have an improved anticorrosive and heat resistant property. Accordingly, a desired sealing property of the seal member is favorably extended for a prolonged time period.

Moreover, conducting rustproof coating treatment onto the dust cover 15 provides a capability for further improving the anticorrosive property.

Also, the dust cover 15, made of the selected material set forth above, may be entirely or partly subjected to surface hardening treatment, such as tempering/hardening or carbonizing to obtain a further increased hardness.

In addition, even in a case where the material (such as general structural pressing steel material) selected for the dust cover 15 has a smaller thermal expansion rate than that of the material (such as aluminum alloy) selected for the cylindrical member 19, the presence of sliding contact between the seal member 17 and the dust cover 15 enables dimensional change, caused by the coefficient of expansion of the dust cover 15, in a drawing margin at the sliding portion in terms of the temperature rise of the cylindrical member 19. Consequently, a favorable sealing property is maintained for a prolonged time period.

Further, the dust cover 15 has an axially extending overlapping portion 119, which is radially displaced from the fore end 111a of the housing 111 with a given distance, and is axially opened. In the presently filed embodiment, the overlapping portion 119 is opened axially inward along the rotational axis of the cylindrical member 19. With such a particular configuration, the dust cover 15 is opened in a direction opposite to that in which the foreign material enters, resulting in a further increased effect for limiting the entry of the foreign material.

Furthermore, an opening portion of the housing 111 has a radially inwardly bent portion 140. The bent portion 140 is held in abutting engagement with one end of an outer race 160 of the bearing 25 and, therefore, the bearing 25 is positioned at the one side of the rotational axis of the cylindrical member 19.

Moreover, a washer 200 is interposed between a nut 210 of the stud bolt 31 and a front distal end surface (fore end 19a) of the cylindrical member 19 to preclude the dust cover 15 from missing from the cylindrical member 19. Simultaneously, the dust cover 15 is also positioned to the one side of the rotational axis of the cylindrical member 19.

Also, the presence of the cylindrical member 19 comprised of the case-like torque transmitting member made of aluminum alloy enables the cylindrical member 19 to be formed in a light weight while enabling reduction in moment of inertia of the rotary member, with a resultant decrease in load of the prime mover.

Further, the rotary member 19, that is the rotary side member free from sliding contact with the seal member 123, may be made of, in addition to light metal such as aluminum alloy, other material such as plastic resin provided that a desired strength is obtained.

Furthermore, the cylindrical member 19 (case-like torque transmitting member) is supported with the front housing 111 by means of the bearing at the position close proximity to the seal member 17 and axially inward of the rotational axis of the rotary member 19.

With such a configuration, it is enabled to select the bearing with a priority given to the support mechanism of the cylindrical member 19. That is, there is no need for using a specific bearing involving the sealing function, resulting in a capability of being liberated from restriction in designing and in a layout space to enable remarkable reduction in the manufacturing cost.

Naturally, a general-purpose seal member can be selected for preference to form the seal member 17.

Further, a plurality of stud bolts 31 are located on the front distal end (fore end 19a) of the cylindrical member (case-like torque transmitting member) 19 at circumferentially spaced positions along the rotational axis of the cylindrical member 19, with the seal member 17 being disposed in an area of the cylindrical member 19 at a position radially outward of the stud bolts 31.

With such particular arrangement, related components are enabled to be connected to one another through the use of the stud bolts 31, which also enable the seal member 17 to be located at a desired position.

Also, while, in the presently filed embodiment, the washer 200 is intended to prevent the dust cover 15 from missing from the cylindrical member 19 toward a radially outward area of the rotational axis of the cylindrical member 19, a companion flange (see FIG. 8) or a joint fork (see FIG. 8) integrally formed with the companion flange may serve as means for preventing the dust cover 15 from missing from the cylindrical member 19.

Further, in conjunction with FIG. 2, the inner shaft 5 (shaft-like torque transmitting member) is disposed in an inner periphery of the cylindrical member (case-like torque transmitting member) 19, with the main clutch 7 being interposed between these power transmitting members. With this configuration, the seal structure of the present invention has a favorable sealing property for a prolonged time period even when applied to a device in which the main clutch 7, whose operating temperature is anticipated to rise, is mounted for connecting or disconnecting the drive power output.

Furthermore, in conjunction with FIG. 2, while the electromagnet 13, disposed in axially close proximity to the pilot clutch 11, produces a magnetic field for the pilot clutch 11 to attract the same for thereby uncoupling the pilot clutch 11, it is possible for the cylindrical member (case-like torque transmitting member) 19 to be made of material to limit the generation of the magnetic field of the electromagnet 13.

While the cylindrical member (case-like torque transmitting member) 19 of the electromagnet clutches 7,11, which are coupled or uncoupled with the electromagnet 13, is made of non-magnetic material such as aluminum alloy or austenite stainless steel to avoid the leakage of the magnetic flux and, in an on-vehicle device, attempts have been made to decrease a loss in a battery, which serves as a power supply of the electromagnet, to improve fuel consumption of the prime mover, the presence of the dust cover, mounted to the case-like torque transmitting member in a manner as set forth above, provides a capability of avoiding the sliding contact between the case-like torque transmitting member and the seal member and, so, the present invention is particularly advantageous in such a structure employing the electromagnet clutch.

According to the presently filed embodiment, further, the seal member 17 is fixed to the fore end 111a of the front housing 111, and the front housing 111 has the radially inwardly extending bent portion 140 formed at the opening of the front housing 111 such that a distance ($r_{s2}$) between a center C of axis of the cylindrical member 19 and a fixed surface of the seal member 17 is smaller than a distance ($r_{B2}$) (i.e., $r_{S2} < r_{B2}$) between the center c of axis and an outer diametrical surface of the bearing 25.

Consequently, it becomes possible to select a fixing surface with a diameter in a further smaller value without a restriction in which the fixing surface of the seal member 17 becomes larger than a radius of curvature of the outer peripheral surface of the bearing.

Further, such a configuration also provides an improved assembling performance of the seal member 17 and the bearing 25.

Furthermore, the presence of the bent portion 140 allows the bearing 25 to be positioned at one side of the rotational axis of the cylindrical member 19.

This advantage is similarly obtained in the structures of subsequent embodiments.

Also, the seal member 17 has a sliding radius ($r_{s1}$) of curvature smaller than that of the rotational radius ($r_{B1}$) of curvature of the bearing 25 (i.e., $r_{S1} < r_{B1}$).

Such a particular configuration enables a sliding speed to be reduced, resulting in a further improved sealing property.

This may be similarly applied to the sliding surface of at least one of the sliding portions in the structure of the subsequent embodiments.

Moreover, in conjunction with FIG. 1, the front housing 111 is the cover that is mounted to a distal end of the differential carrier 314 and the cylindrical member (case-like torque transmitting member) 19 has the front distal end exposed to the opening portion formed at the end of the front housing 111 to permit the drive power output to be connected to one of the input shaft and output shaft. And, the inner shaft (shaft-like torque transmitting member) 5 disposed in the inner peripheral side of the cylindrical member (case-like torque transmitting member) 19 is connected to one drive shaft of the input shaft and the output shaft via the clutches 7, 11 which are coupled or uncoupled.

The use of the seal structure embodying the present invention in such a drive power transmitting device mentioned above enables the device per se and associated structures to be formed in a compact configuration with a minimum layout space.

Also, the seal member 141 is comprised of a retaining fixture 135 and a seal portion 133 which are integrally formed with one another. The retaining fixture 135 is press fitted to an inner periphery of the rear housing 113, with the seal portion 133 being held in sliding contact with the outer periphery of the rotor 21. Since the rotor 21 is made of iron alloy to have a high hardness, there is less provability of wear due to the sliding contact with the seal portion 133 to have an extended durability.

Further, disposed between the core 29 of the electromagnet 13 and the rear housing 113 are the dish spring 137 and the washer 139, with the dish spring 137 exerting an urging force to the rotary case 3 and the inner shaft 5 which are consequently pressed forward to eliminate an axial clearance between the electromagnetic coupling 1 and the housing 14.

With the axial clearance being reduced, an axial vibration is removed from associated sliding regions between the respective seal members 123, 133 of the seal members 17, 141 and the respectively associated parts (cylindrical member 19 and rotor 21), resulting in a remarkable increase in the durability of the sliding regions.

Further, formed at an outer periphery of the front housing 111 forming the housing 14 a plurality of cooling fins 139 which cools the space inside the housing 14 and the electromagnetic coupling 1 located in such a space.

In such a way, the essential part of the seal structure of the first embodiment according to the present invention for use in the electromagnet coupling 1 is structured.

As set forth above with reference to the first embodiment of the present invention, with such a seal structure, the electromagnetic coupling 1 concerns the presence of the seal portion 123 (lips 127, 129) of the seal 17 held in sliding contact with the dust cover 15 made of iron alloy and having the high hardness whereby the cylindrical member 19 is avoided from sliding on the seal portion 123 to preclude the cylindrical portion 19 from being worn due to the sliding contact.

Accordingly, it becomes possible for the cylindrical member 19 to be made of aluminum alloy, resulting in the electromagnetic coupling 1 with a remarkable light weight.

The presence of the light weight of the electromagnetic coupling 1 renders the electromagnetic coupling 1 to have a minimized inertia of momentum with less unbalance in rotation and less vibration due to such unbalanced rotation while minimizing the fuel consumption of the engine.

Further, the utilization of the wear-resistant property of the dust cover 15 provides no need for a component specific for sealing, such as a collar, to improve the wear-resistance property to be additionally and newly prepared, avoiding an increase in the number of component parts and their costs, management costs of the component parts and working costs for assembly.

Furthermore, with the seal structure set forth above, since the seal member 17 is disposed between the dust cover 15 and the front housing 111 (stationary member) (i.e., the dust cover 15 ad the seal member 17 are located in the same location), the seal structure has a narrower layout space than that of the related art coupling in which the seal and the dust cover are disposed in separate locations, resulting in a simplified structure of the electromagnetic coupling 1 involving the dust cover 15.

Moreover, the presence of the cylindrical member 19 made of aluminum alloy (non-magnetic material) precludes the magnetic flux from being leaked for eliminating loss in the battery serving as the power supply of the electromagnet 13, resulting in a further reduction in the fuel consumption of the engine. Thus the present invention, which enables the cylindrical member 19 to be made of the non-magnetic material, is particularly advantageous in a rotary member such as the electromagnetic coupling 1 that causes the clutch to be intermittently coupled or uncoupled with the electromagnet.

In addition to an attempt to prepare the cylindrical member 19 made of light metal such as aluminum alloy, the cylindrical member 19 may be made of austenite stainless steel with a relatively low hardness and, further, if a sufficient strength is obtained, the cylindrical member 19 may be made of plastic resin.

Further, with the embodiment discussed above, the main clutch 7 functions as a mechanism to transmit the drive power output between the case-like torque transmitting member (rotary case 3) and the axial torque transmitting member (inner shaft 5). Thus, only the presence of the outer plates 53 and the inner plates 57 has no meaning, and in addition to the respective plates 53, 57, the rotary case 3 and the inner shaft 5 similarly constitute essential components of the main clutch 7.

Furthermore, in the same reason, the pilot clutch 11 is comprised of the rotary case 3, the cam ring 63, the outer plates 69 and the inner plates 71 all of which serve as essential components.

Moreover, the ball cam 9 includes a cam mechanism, for converting the resulting drive torque into the urging force, which is comprised of not only the pressure plate 61, the cam ring 63, the cam surface formed thereon and a plurality of balls disposed between adjacent components, but also the inner shaft 5 to transmit the drive power output to the pressure plate 61, the rotary case 3 for transmitting the drive power output to the cam ring 63, and the pilot clutch 11, all of which form essential components.

Further, the main clutch 7 and the pilot clutch 11 may include clutches of any types involving, in addition to the multiple plate type clutches, frictional clutches, such as single plate clutches and cone type clutches. Also, these clutches may of wet types or dry types.

Furthermore, the present invention is not limited to a particular structure shown in the presently filed embodiment in which the electromagnet clutch is structured with the pilot clutch and the cam mechanism to couple the main clutch, and may take the form of a structure wherein the main clutch is directly urged with an armature adapted to be moveably operated with an electromagnet or a spring.

Further, the seal structure of the present invention may be widely applied to rotational members and may be applied to not only the coupling adapted to be coupled or uncoupled by means of the clutch as in the presently filed embodiment but also a coupling such as one of the related art which is operative to transmits torque by means of shearing resistance of a viscous fluid without coupling or uncoupling operations.

Figure 4:
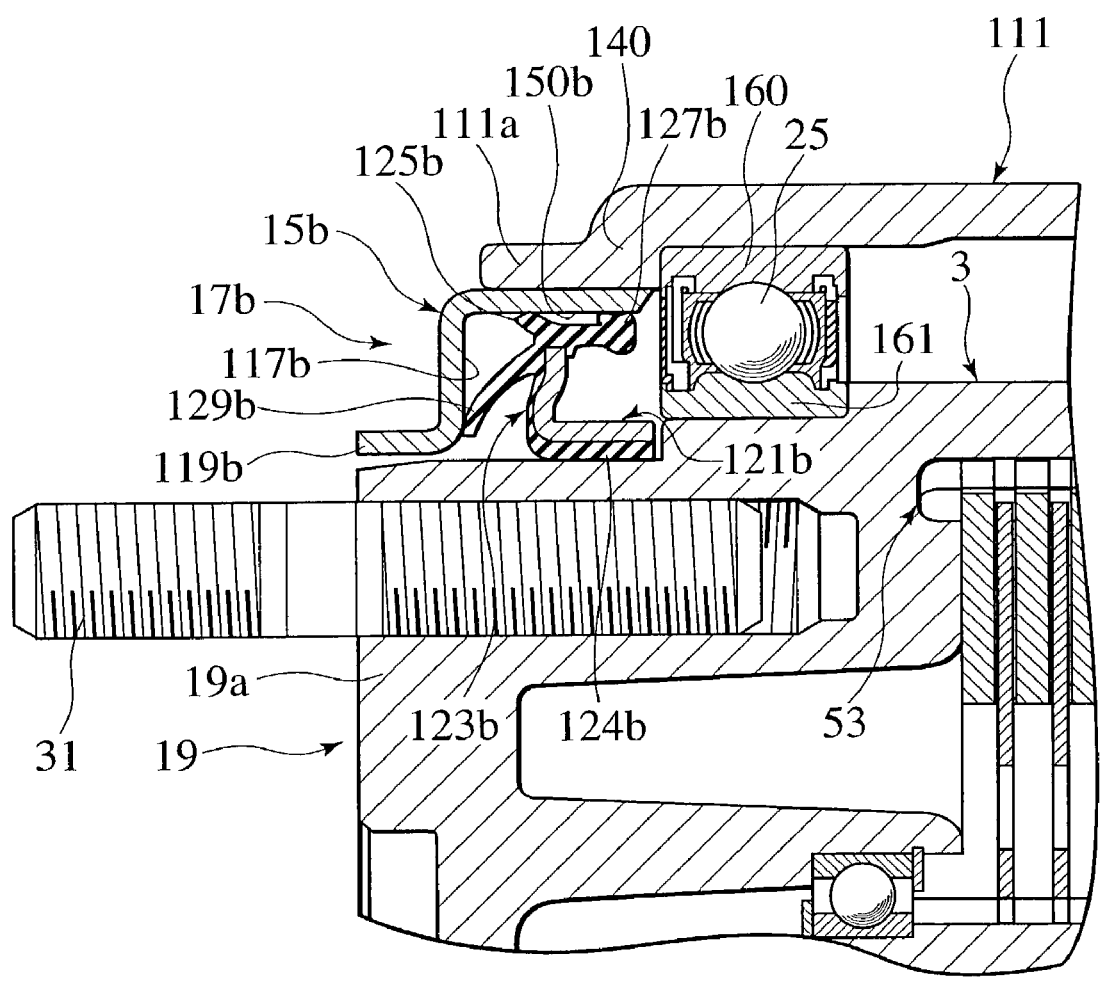
FIG. 4 is a cross sectional view illustrating an essential part of a seal structure of a second embodiment according to the present invention.

FIG. 4 is an enlarged cross sectional view illustrating an essential part of a seal structure of a second embodiment according to the present invention. This embodiment is a modified form of the first embodiment and has the same structure as that of the first embodiment except in that a sliding area between a duct cover 15b and a seal member 17b is located in close proximity to the front housing 111. Accordingly, like parts bear like reference numerals as those used in the first embodiment to omit description of the same parts.

The seal member 17b is comprised of a retaining fixture (support member) 121b and a seal portion 123b which are integrally formed, with the seal portion 123b being formed with three pieces of lips 125b, 127b, 129b.

The retaining fixture 121b is press fitted to an outer periphery of the fore end 19a of the cylindrical member 19 via a base portion 124b of the seal portion 123b. A press fitted area may be additionally applied with sealing material. Also, the lips 125b, 127b, 129b are held in sliding contact with the dust cover 15b. In particular, the lips 125b, 127b are held in contact with a thrust surface 150b of the nose 111a of the front housing Ill concentric with the rotational axis of the cylindrical member 19, with an annular sliding portion being defined between the thrust surface 150b and the seal portion 123b. Moreover, the lip 129b is held in contact with a radial surface (side wall) 117b of the dust cover 15b concentric with the rotational axis of the cylindrical member 19, with an annular sliding portion being formed between the thrust surface 117b and the seal portion 123b.

Further, the dust cover 15b has an overlapping portion 119b which is axially opened with a given space defined relative to the outer periphery of the fore end 19a of the cylindrical member 19 and, in the second embodiment, the overlapping portion 119b is opened outward with respect to the rotational axis of the cylindrical member 19. In this case, although the opening of the overlapping portion 119b is directed in the same direction as that in which the foreign material enters, since the opening of the overlapping portion 119b is closed with the washer 200, which is described in connection with the first embodiment, interposed between the nuts 210 of the stud bolts 31 and the distal end (fore end 19a) of the cylindrical member 19, it is possible to obtain an adequate effect for limiting the entry of the foreign material. Of course, such a structure is also capable of preventing the dust cover 15b from missing from the front housing 111.

Also, such a limiting effect is obtained by closing the opening of the overlapping portion 119b with the companion flange (see FIG. 8) or the joint fork (see FIG. 8) integrally formed with the companion flange in place of the washer 200.

From the foregoing description, it is to be noted that the seal structure of the second embodiment also has the same advantage as that of the first embodiment.

Figure 5:
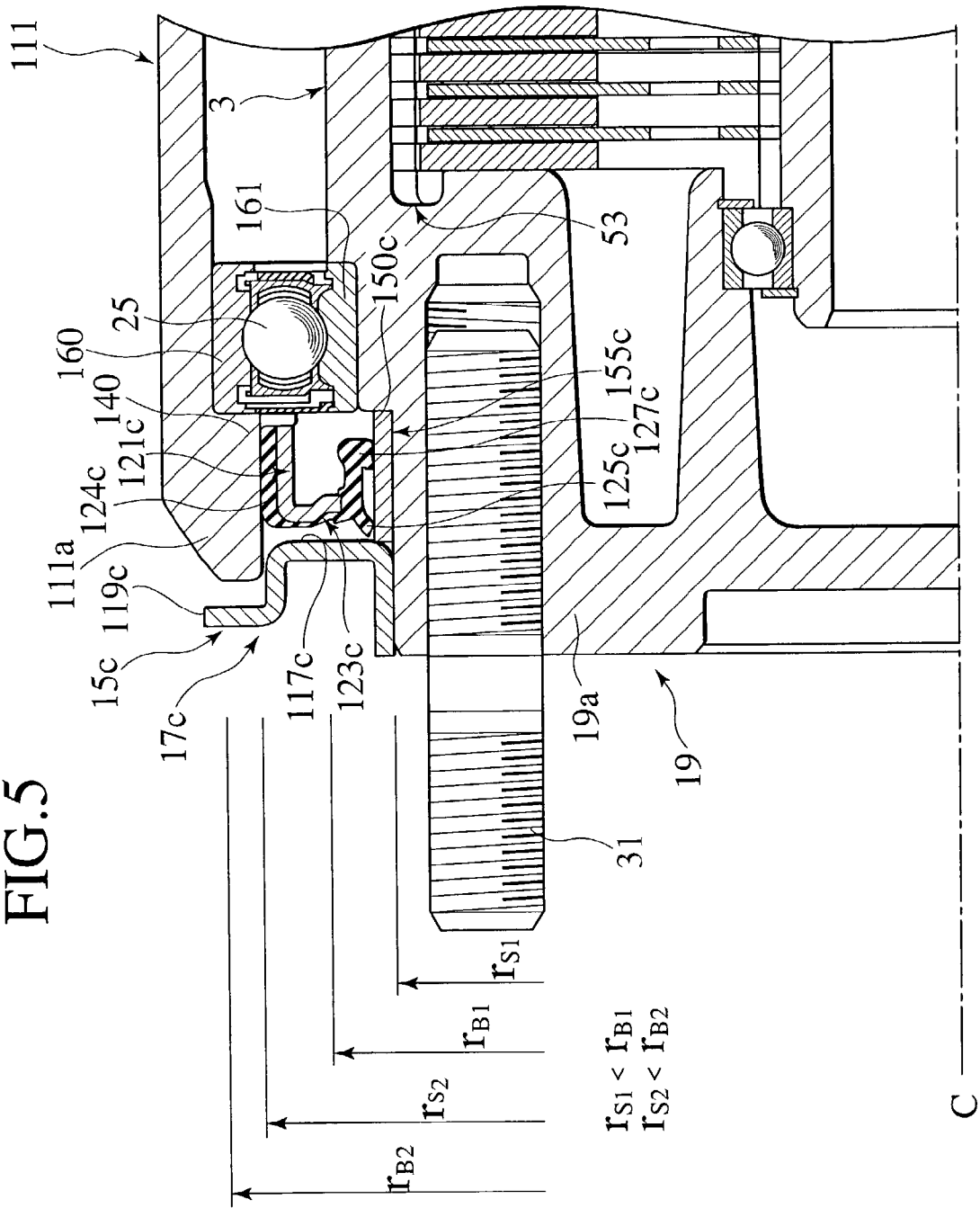
FIG. 5 is a cross sectional view illustrating an essential part of a seal structure of a third embodiment according to the present invention.

FIG. 5 is an enlarged cross sectional view illustrating an essential part of a seal structure of a third embodiment according to the present invention. This embodiment has the same structure as that of the first embodiment except in that a seal member 17c is also held in sliding contact with the cylindrical member 19 via a sliding surface 150c of a hard sleeve member 155c made of hard material. Accordingly, like parts bear like reference numerals as those used in the first embodiment to omit description of the same parts.

The seal member 17c is comprised of a retaining fixture (support member) 121c and a seal portion 123c which are integrally formed, with the seal portion 123c being formed with two pieces of lips 125c, 127c.

The retaining fixture 121c is press fitted to an inner periphery of the fore end 111a of the front housing 111 via a base portion 124c of the seal portion 123c. A press fitted area may be additionally applied with sealing material. Also, the lips 125c, 127c are held in sliding contact with the hard member 155c. In particular, the lips 125c, 127c are held in sliding contact with a sliding surface 150c of the hard member 155c concentric with the cylindrical member 19, with an annular sliding portion being formed between the sliding surface 150c and the seal portion 123c.

The presently filed embodiment has an advantage, in addition to the advantages achieved by the first embodiment, in that, in a case where material (aluminum alloy, stainless, brass or carbon) is selected for the cylindrical member (case-like member) 19 for the purpose of forming the cylindrical member 19 in a light weight and using non-magnetic material, the presence of the sliding portion formed between the fore end 19a of the cylindrical member 19 and the hard member 155c provides a capability for the seal member 17c to have a sealing capability and sliding characteristic maintained under a favorable condition for a prolonged time period.

Figure 6:
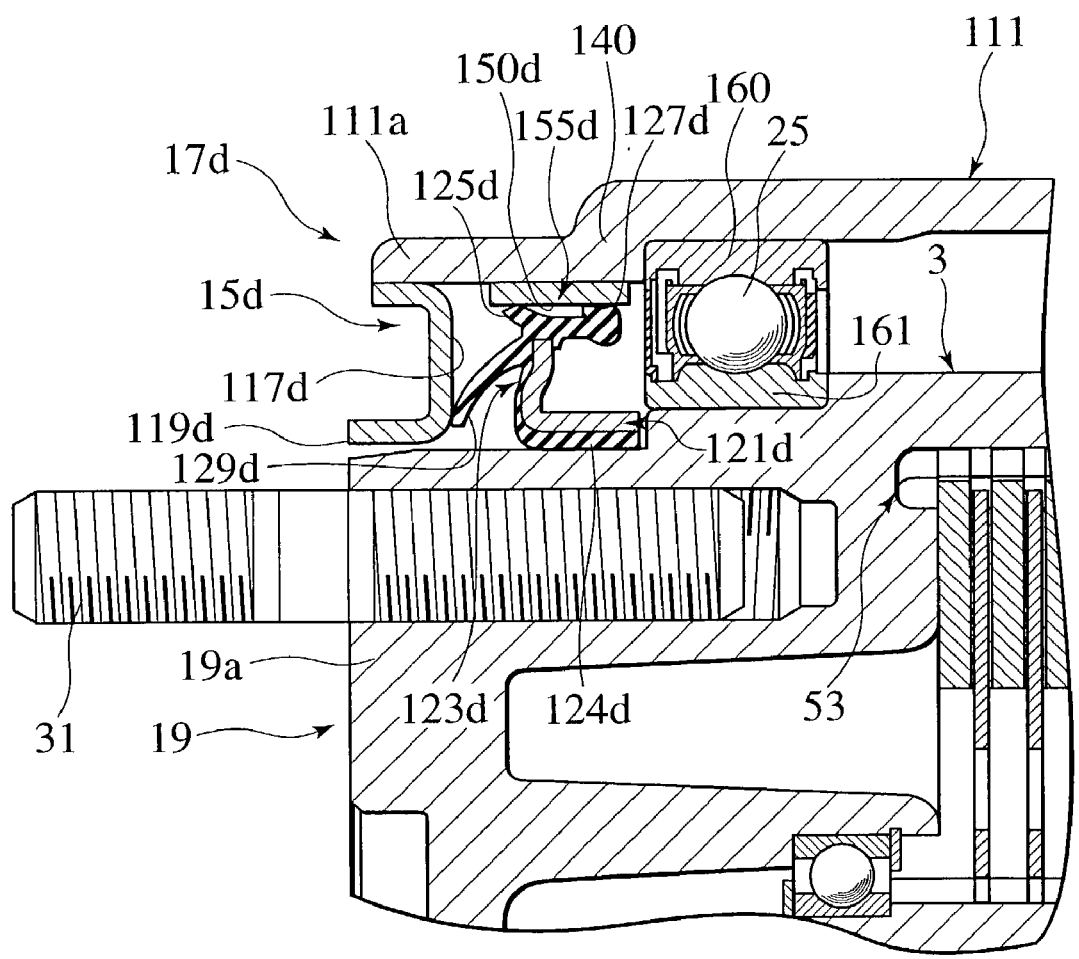
FIG. 6 is a cross sectional view illustrating an essential part of a seal structure of a fourth embodiment according to the present invention.

FIG. 6 is an enlarged cross sectional view illustrating an essential part of a seal structure of a fourth embodiment according to the present invention. This embodiment is a modified form of the third embodiment and has the same structure as that of the third embodiment except in that a hard sleeve member 155d is disposed in the front housing 111. Accordingly, like parts bear like reference numerals as those used in the third embodiment to omit description of the same parts.

The seal member 17d is comprised of a retaining fixture (support member) 121d and a seal portion 123d which are integrally formed with one another, with the seal portion 123d being formed with three pieces of lips 125d, 127d, 129d.

The retaining fixture 121d is press fitted to an outer periphery of the fore end 19a of the cylindrical member 19 via a base portion 124d of the seal portion 123d. A press fitted area may be additionally applied with sealing material. Also, the lips 125d, 127d are held in sliding contact with the sleeve 155d. In particular, the lips 125d, 127d are held in sliding contact with the fore end 111a of the front housing 111 via the hard member 155d. In particular, the lips 125d, 127d are held in contact with a thrust surface 150d of the hard member 155d concentric with the rotational axis of the cylindrical member 19, with an annular sliding portion being formed between the thrust surface 150d and the seal portion 123d. Further, the lip 129d is held in contact with a radial surface (side wall) 117d of the dust cover 15d concentric with the rotational axis of the cylindrical member 19, with an annular sliding portion being formed between the radial surface 117d and the seal portion 123d.

Further, the dust cover 15d has an overlapping portion 119d which is axially opened with a given space defined relative to the outer periphery of the fore end 19a of the cylindrical member 19 and, in the third embodiment, the overlapping portion 119d is opened axially outward with respect to the rotational axis of the cylindrical member 19. In this case, although the opening of the overlapping portion 119d is directed in the same direction as that in which the foreign material enters, since the opening of the overlapping portion 119d is closed with the washer 200, which is described in connection with the first embodiment, interposed between the nuts 210 of the stud bolts 31 and the distal end (fore end 19a) of the cylindrical member 19, it is possible to obtain an adequate effect for limiting the entry of the foreign material. Of course, such a structure is also capable of preventing the dust cover 15d from missing from the front housing 111.

Also, such a limiting effect is obtained by closing the opening of the overlapping portion 119d with the companion flange (see FIG. 8) or the joint fork (see FIG. 8) integrally formed with the companion flange in place of the washer 200.

From the foregoing description, it is to be noted that the seal structure of the fourth embodiment also has the same advantage as that of the third embodiment.

Figure 7:
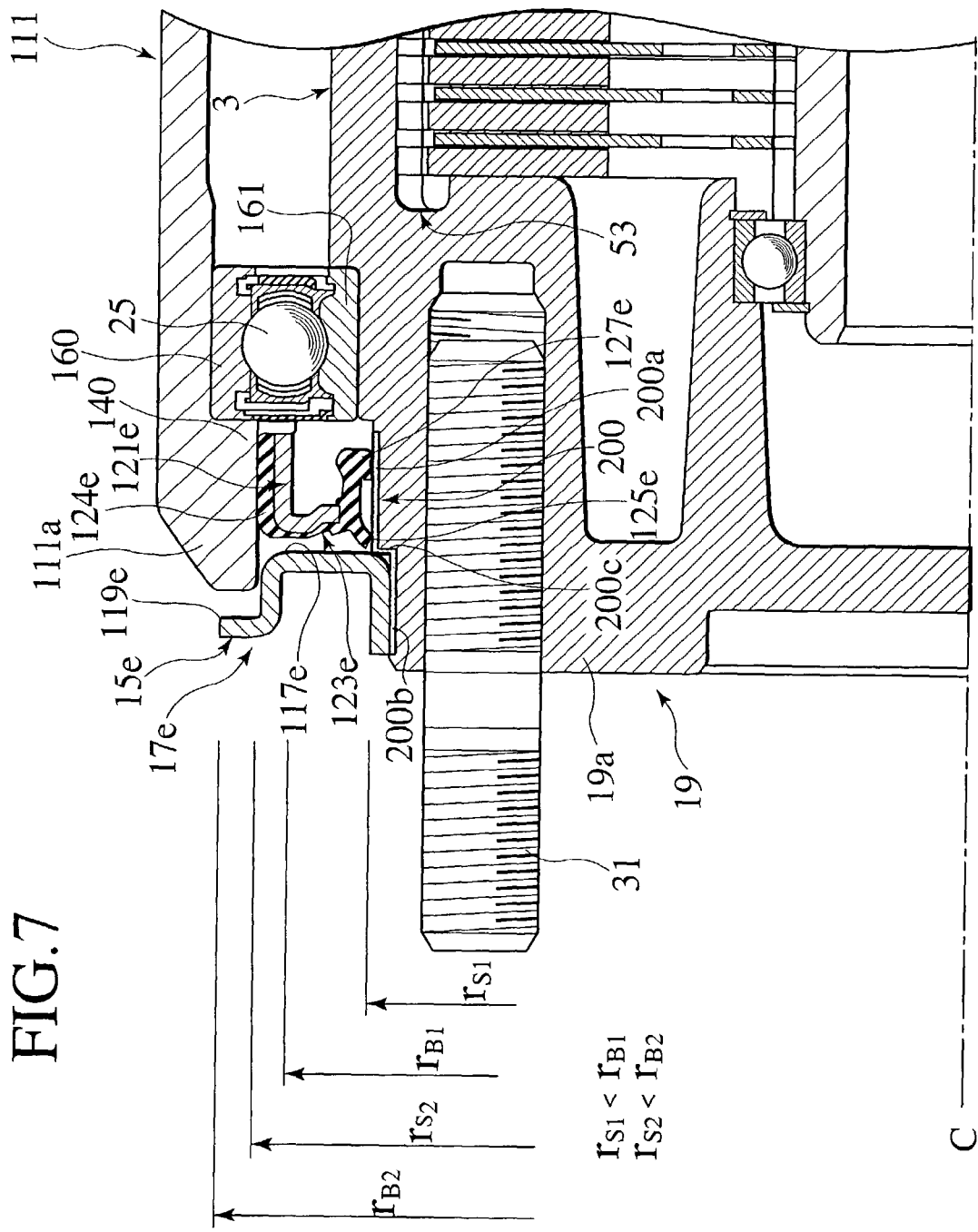
FIG. 7 is a cross sectional view illustrating an essential part of a seal structure of a fifth embodiment according to the present invention.

FIG. 7 is an enlarged cross sectional view illustrating an essential part of a seal structure of a fifth embodiment according to the present invention. This embodiment has the same structure as that of the third embodiment except in that a sliding portion is formed between a treated surface 200 and a seal member 17e. Accordingly, like parts bear like reference numerals as those used in the third embodiment to omit description of the same parts.

The seal member 17e is comprised of a retaining fixture (support member) 121e and a seal portion 123e which are integrally formed with one another, with the seal portion 123e being formed with two pieces of lips 125e, 127e.

The retaining fixture 121e is press fitted to an inner periphery of the fore end 111a of the front housing 111 via a base portion 124e of the seal portion 123e. A press fitted area may be additionally applied with sealing material. Also, the lips 125e, 127e are held in sliding contact with the treated surface 200 (at 200a), which is subjected to surface hardening treatment, of the fore end 19a of the cylindrical member 19. In particular, the lips 125e, 127e are held in sliding contact with a thrust surface (treated surface) 200a, which is subjected to surface hardening treatment, of the fore end 19a of the cylindrical member 19, with an annular sliding portion being formed between the thrust surface 200a and the seal portion 123e.

According to this embodiment, the seal structure has, in addition to the effects of the third embodiment, an improved strength of the sliding portion while enabling the corrosion resistant property, the heat-resistant property and the anti-wearing property to be further improved.

Also, the surface hardening treatment involves heat treatment such as tempering/quenching or carbonizing and anode oxidizing treatment and, in addition to these treatments, further involves PTFE coating providing a self-lubricating property, nickel dispersion plating, chrome plating and electroless nickel plating.

Further, a stepped portion 200c formed between adjacent treated surfaces 200a, 200b, which are subjected to surface hardening treatment, of the fore end 19a of the cylindrical member 19 such that the stepped portion 200c permits the dust cover 15e to be positioned at one side of the rotational axis of the cylindrical member 19.

Figure 8:
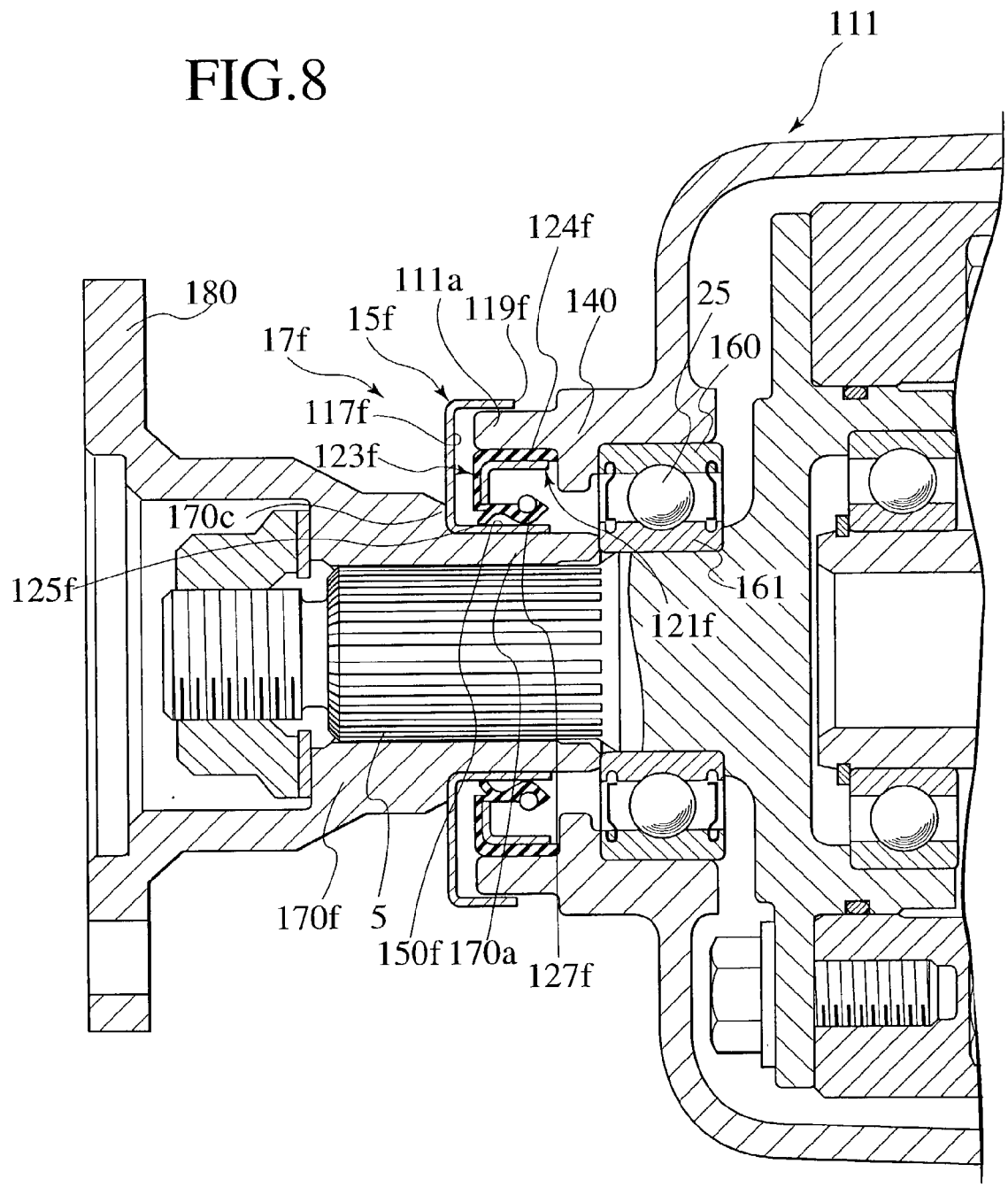
FIG. 8 is a cross sectional view illustrating an essential part of a seal structure of a sixth embodiment according to the present invention.

FIG. 8 is an enlarged cross sectional view illustrating an essential part of a seal structure of a sixth embodiment according to the present invention. This embodiment has the same structure as that of the first embodiment except in that a dust cover 15f is fixed to a centering portion 170a of a joint fork 170f integrally formed with a companion flange 180 as a coupling. Accordingly, like parts bear like reference numerals as those used in the first embodiment to omit description of the same parts.

The seal member 17f is comprised of a retaining fixture (support member) 121f and a seal portion 123f which are integrally formed with one another, with the seal portion 123f being formed with two pieces of lips 125f, 127f.

The retaining fixture 121f is press fitted to the nose 111a of the front housing 111 via a base portion 124f of the seal portion 123f. A press fitted area may be additionally applied with sealing material. The dust cover 15f is secured to the centering portion 170a of the joint fork 170f formed with the companion flange 180 as the coupling. And, the lips 125f, 127f are held in sliding contact with the dust cover 15f. In particular, the lips 125f, 127f are held in sliding contact with a thrust surface (treated surface) 150f of the dust cover 15f concentric with the rotational axis of the cylindrical member 19, with an annular sliding portion being formed between the thrust surface 150f and the seal portion 123f.

Thus, the cylindrical member (case-like torque transmitting member) 19 is structured with the inner shaft 5 and the joint fork (integrally formed with the companion flange 180 as the coupling) 170f which is unitarily connected to the inner shaft 5. And, the dust cover 15f is secured to the centering portion 170a of the joint fork 170f.

Further, the joint fork 170f is formed with a stepped portion 170c to allow the dust cover 15f to be positioned to one side of the rotational axis.

According to this embodiment, the seal structure has, in addition to the effects of the first embodiment, the provision of an additional shaft member such as the joint fork (or companion flange 180) 170f results in an ease of assembling and fixing the dust cover 15f. Accordingly, an assembling capability with respect to the seal member 17f is highly improved.

Furthermore, the freedom of designing a shape of the shaft member and selecting the seal member is highly improved.

Figure 9:
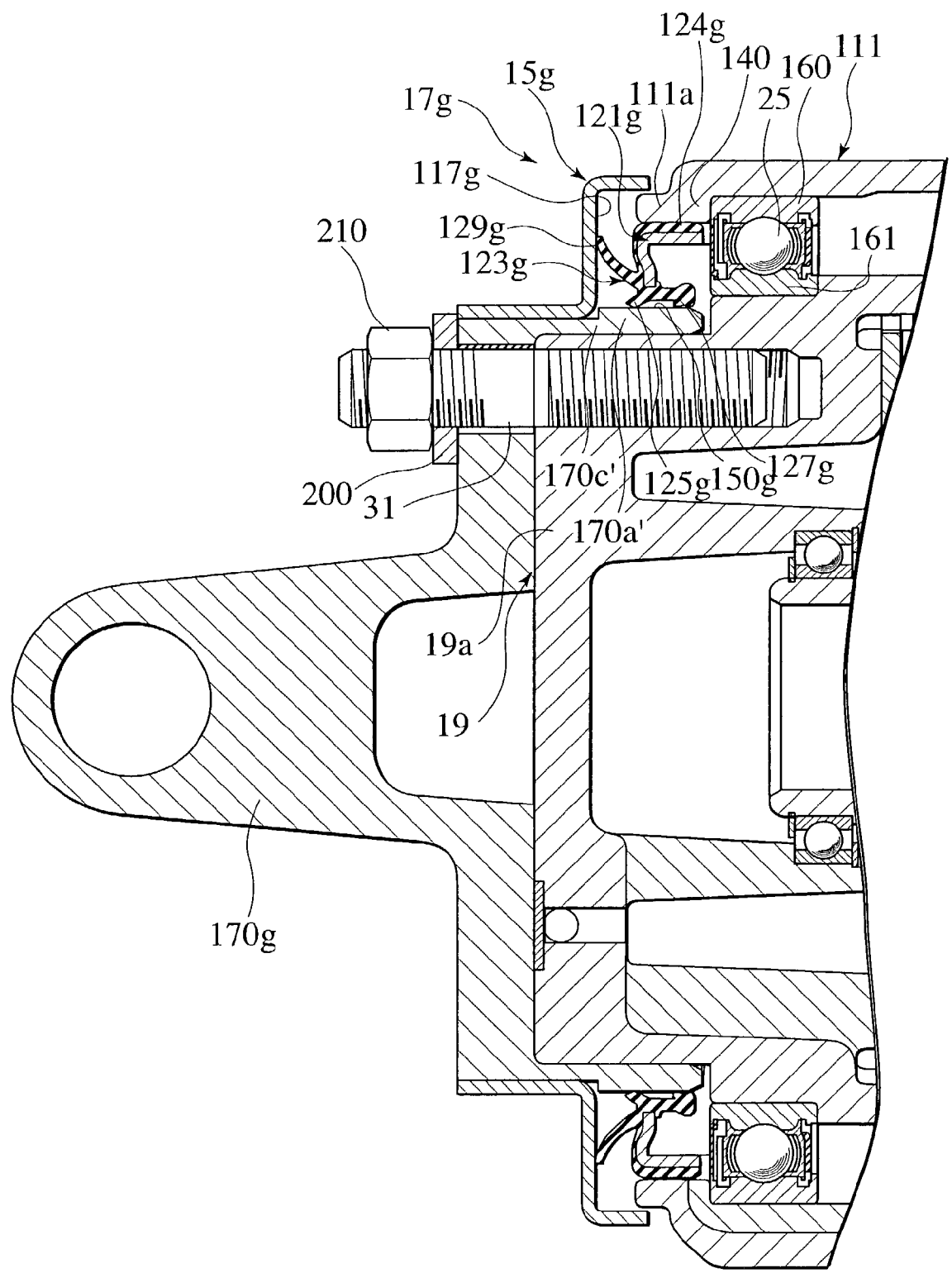
FIG. 9 is a cross sectional view illustrating an essential part of a seal structure of a seventh embodiment according to the present invention.

FIG. 9 is an enlarged cross sectional view illustrating an essential part of a seal structure of a seventh embodiment according to the present invention. This embodiment is a modified form of the sixth embodiment and has the same structure as that of the sixth embodiment except in that a structure is provided to position a dust cover 15g at one side of the rotational axis and to prevent the dust cover 15g from missing with the washer 200. Accordingly, like parts bear like reference numerals as those used in the sixth embodiment to omit description of the same parts.

The seal member 17g is comprised of a retaining fixture (support member) 121g and a seal portion 123g which are integrally formed with one another, with the seal portion 123g being formed with three pieces of lips 125g, 127g, 129g.

The retaining fixture 121g is press fitted to the nose 111a of the front housing 111 via a base portion 124g of the seal portion 123g. A press fitted area may be additionally applied with sealing material. The dust cover 15g is secured to the centering portion 170a' of the joint fork 170g formed with the companion flange 180 as the coupling. And, the lips 125g, 127g are held in sliding contact with the dust cover 15g. In particular, the lips 125g, 127g are held in sliding contact with a thrust surface (treated surface) 150g of the dust cover 15g concentric with the rotational axis of the cylindrical member 19, with an annular sliding portion being formed between the thrust surface 150g and the seal portion 123g.

Thus, the cylindrical member (case-like torque transmitting member) 19 is structured with the inner shaft 5 and the joint fork (integrally formed with the companion flange 180 as the coupling) 170g which is unitarily connected to the inner shaft 5. And, the dust cover 15g is secured to the centering portion 170a of the joint fork 170g.

When securing the dust cover 15g in a fixed place, the washer 200 is interposed between the joint fork 170g and the distal end (fore end 19a) of the cylindrical member 19 and fixed in place with the nuts 210 tightened to the bolts 31.

Further, in the presently filed embodiment, the joint fork 170g is formed with a stepped portion 170c' to allow the dust cover 15g to be positioned to one side of the rotational axis and prevented from axially missing outward with respect to the rotational axis.

From the foregoing description, it appears that the seventh embodiment also has various effects similar to those of the sixth embodiment.

The entire content of Japanese Application No. P2001-197110 with a filing date of Jun. 28, 2001 is herein incorporated by reference.

Although the present invention has been described above by reference to certain embodiments of the invention, the invention is not limited to the embodiments described above and modifications will occur to those skilled in the art, in light of the teachings. The scope of the invention is described with reference to the following claims.

What is claimed is:

1. A seal structure, separated from a bearing structure, for sealing a gap between a first member and a second member disposed rotationally relative to the first member and including a case-like torque transmitting member, the seal structure comprising:
   a cover member preventing foreign material from entering the gap; and
   a seal member fixedly secured to at least one of the first and second members and held in sliding contact with the cover member to seal the gap,
   wherein the case-like torque transmitting member is supported with the first member via the bearing structure at a position axially spaced from the seal member and a clutch disposed inside the case-like torque transmitting member, and
   wherein the cover member includes first and second bending portions extending along a rotational axis of the case-like torque transmitting member, wherein the seal member is held in sliding contact with the first bending portion of the cover member, said cover member secured to at least the other of the first and second members and wherein the second bending portion is displaced from one of the first member and the case-like torque transmitting member at a given distance in a radial direction of the case-like torque transmitting member.

2. The seal structure according to claim 1, wherein the second member has a larger coefficient of thermal expansion than that of the cover member.

3. The seal structure according to claim 1, wherein the second member has a lower hardness than that of the cover member.

4. The seal structure according to claim 1, wherein the case-like torque transmitting member is made of aluminum alloy.

5. The seal structure according to claim 1, wherein the case-like torque transmitting member has an inner periphery to accommodate therein a shaft-like torque transmitting member, and the clutch is disposed between the case-like torque transmitting member and the shaft-like torque transmitting member to connect and disconnect a drive power.

6. The seal structure according to claim 5, wherein an electromagnet is disposed in the vicinity of the clutch along an axis thereof for producing magnetic flux for the clutch to attract the same for coupling and uncoupling the clutch, and wherein the case-like torque transmitting member is made of material that limits the magnetic flux to permeate.

7. The seal structure according to claim 1, wherein the seal member has a sliding radius of curvature smaller than a rotating radius of curvature of the bearing.

8. The seal structure according to claim 1, wherein the seal member includes a seal portion that is held in sliding contact with a radial surface of the cover member.

9. The seal structure according to claim 1, wherein the second member includes a rotary shaft, and a shaft member unitarily connected to an outer periphery of the rotary shaft, and wherein the cover member is fixedly secured to the shaft member.

10. The seal structure according to claim 1, further comprising:
    a slip-out preventive member located at an outward distal end of the second member along a rotational axis thereof to prevent the cover member from slipping out.

11. The seal structure according to claim 1, wherein the first member has a bent portion forming an opening for positioning the bearing structure in an area axially inside of the first member.

12. A seal structure, separated from a bearing structure, for sealing a gap between a first member and a second member disposed rotationally relative to the first member and including a case-like torque transmitting member, the seal structure comprising:
    a seal member disposed between the first member and the case-like torque transmitting member,
    wherein the case-like torque transmitting member is supported with the first member via the bearing structure at a position axially spaced from the seal member and a clutch having clutch plates disposed inside the case-like torque transmitting member,
    wherein the seal member has a sliding radius of curvature smaller than a rotating radius of curvature of the bearing,
    wherein the first member has a bent portion forming an opening for positioning the bearing structure in an area axially inside of the first member, and
    wherein the bent portion further positions the bearing structure in area radially outside of the clutch plates.

13. The seal structure according to claim 12,
    wherein the seal member is fixedly secured to the first member at a fixing surface thereof, and the first member has an opening formed with a bent portion such that a distance between a center of axis of the case-like torque transmitting member and the fixing surface is less than a distance between the center of axis and an outer diametrical surface of the bearing.

14. The seal structure according to claim 12, wherein the seal member is held in sliding contact with the case-like torque transmitting member at a sliding surface thereof, and the sliding surface of the case-like torque transmitting member is subjected to a surface hardening treatment.

15. The seal structure according to claim 12,
    wherein the seal member is held in sliding contact with the case-like torque transmitting member at a sliding surface thereof, and the sliding surface of the case-like torque transmitting member is formed with hard material.

16. The seal structure according to claim 12,
    wherein the case-like torque transmitting member has a distal end surface provided with a plurality of bolts axially extending at circumferentially spaced positions, and the seal member is located at a position radially outward of the case-like torque transmitting member with respect to the bolts.

17. The seal structure according to claim 12, further comprising:
- a cover member preventing foreign material from entering the gap, and
- a slip-out preventive member fixed to an outer distal end of the case-like torque transmitting member along a rotational axis thereof to prevent the cover member from slipping out.

18. The seal structure according to claim 12,
- wherein the first member comprises a cover member mounted to a distal end of a differential carrier and having an opening,
- wherein the case-like torque transmitting member has a distal end exposed to the opening of the first member and connected to one of an input shaft and an output shaft, and
- wherein a shaft-like torque transmitting member is disposed at an inner periphery side of the case-like torque transmitting member and connected to the one of the input and output shafts via a clutch that is coupled and uncoupled.

19. A seal structure, separated from a bearing structure, for sealing a gap between a first member and a second member disposed rotationally relative to the first member and including a case-like torque transmitting member, the seal structure comprising:
- a cover member preventing foreign material from entering the gap; and
- a seal member fixedly secured to at least one of the first and second members and held in sliding contact with the cover member to seal the gap,
- wherein the case-like torque transmitting member is supported with the first member via the bearing structure at a position axially spaced from the seal member and a clutch having clutch plates disposed inside the case-like torque transmitting member,
- wherein the first member has a bent portion forming an opening for positioning the bearing structure in an area axially inside of the first member, and
- wherein the bent portion further positions the bearing structure in an area radially outside of the clutch plates.

* * * * *